(No Model.)
E. SCOTT & J. O. BURKE.
ATTACHMENT FOR BICYCLES.
No. 530,726. Patented Dec. 11, 1894.
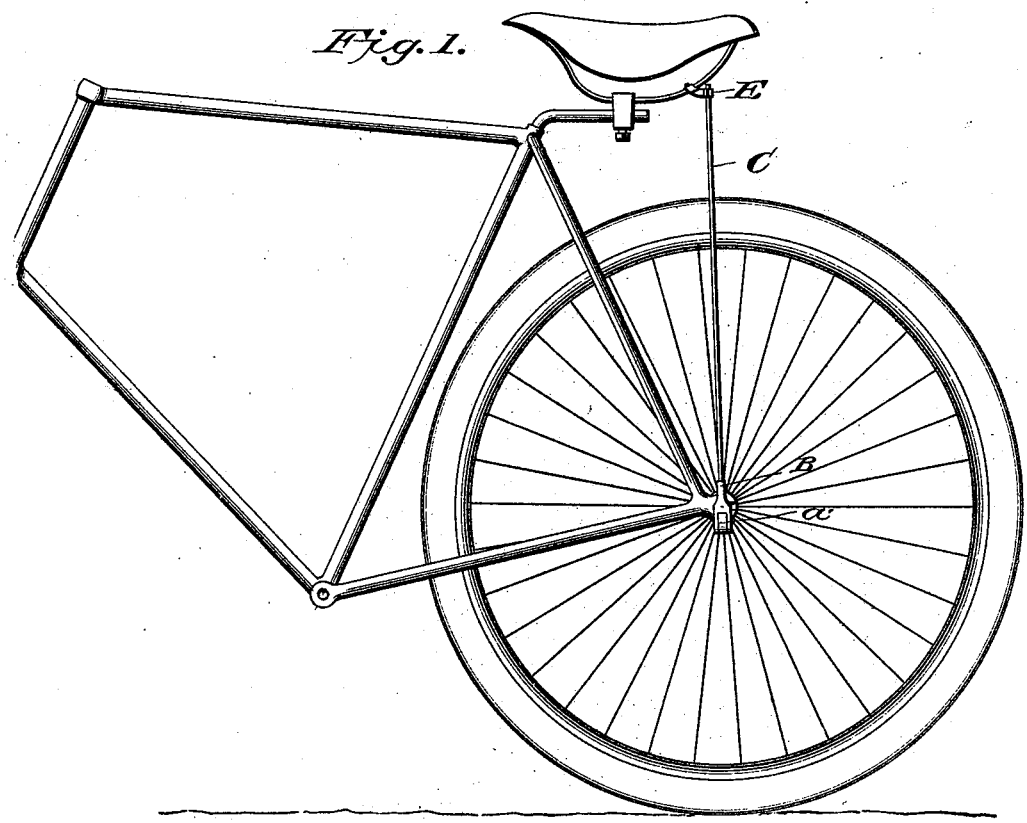
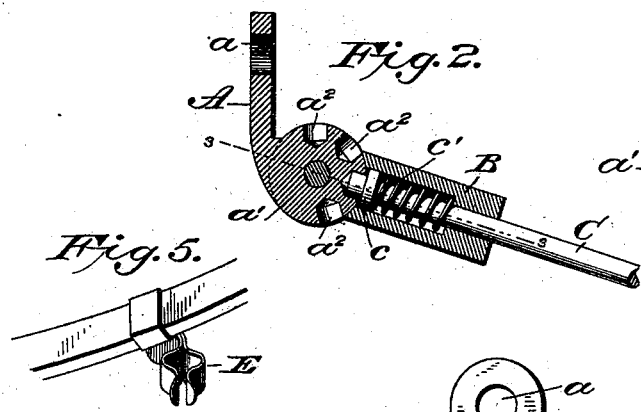
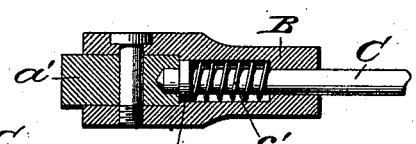
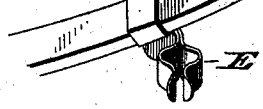
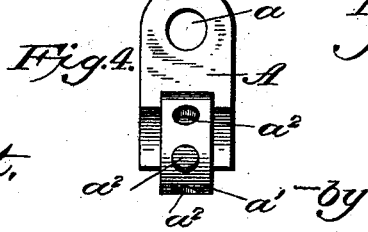
WITNESSES
Ebenezer Scott
John O. Burke
INVENTORS:
Attorney

UNITED STATES PATENT OFFICE.

EBENEZER SCOTT AND JOHN O. BURKE, OF RED BANK, NEW JERSEY.

ATTACHMENT FOR BICYCLES.

SPECIFICATION forming part of Letters Patent No. 530,726, dated December 11, 1894.

Application filed March 17, 1894. Serial No. 504,029. (No model.)

*To all whom it may concern:*

Be it known that we, EBENEZER SCOTT and JOHN O. BURKE, citizens of the United States of America, residing at Red Bank, in the county of Monmouth and State of New Jersey, have invented certain new and useful Improvements in Attachments for Bicycles; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a simple, cheap and effective device for supporting a bicycle when not in use; and it consists in an attachment for bicycles comprising two parts connected to each other by a knuckle-joint, the part which is adapted to be secured to the frame of the bicycle having a series of notches or recesses and the other part carrying a rod movable therein so that it can engage the notches or recesses to permit its adjustment at various angles, as will be hereinafter fully set forth.

In the accompanying drawings, Figure 1 is a side elevation, partly broken away, showing our improvement applied to a bicycle. Figs. 2 and 3 are detail sectional views. Fig. 4 is a detail view of that part of the fixture which is attached rigidly to the bicycle, and Fig. 5 is a view of the clamp for the supporting rod.

A designates the part of the attachment which is secured to the bicycle, it being preferably attached to one of the hub spindles and is provided with an aperture $a$ for this purpose, though it is obvious it could be clamped to any part of the frame. At one end of the part A is formed an apertured lug or ear $a'$ to which is pivoted the part B of the attachment. This lug is provided in its outer edge with a series of notches or recesses $a^2$ with which engages a rod C carried by the part B.

The part B is made up of a casting having an enlarged end bifurcated to embrace the lug $a'$ and apertured to receive the connecting pin or bolt, and the said casting is further bored or apertured to receive the rod C which fits loosely therein, the bore opening into the space between the members of the bifurcated end, at which point it is enlarged to receive a collar $c$ secured to or formed on the rod C so as to limit the movement of the same when the parts are connected. The inner end of the rod C is shaped to engage the notches or recesses formed in the lug on the part A, and when disengaged the part B may be turned upon its pivot to position the rod at the proper angle to support the bicycle, the rod being then held by causing its engagement with the notches or recesses. A notch or recess is provided at the upper part of the lug $a$ so that the rod can be supported or held in position against the frame of the bicycle when not in use.

A helical spring, $c'$, may be placed upon the rod C to be interposed between the collar $c$ and the base of the enlarged part of the recess in the part B so as to force the end of the rod in engagement with the recesses. It will be understood that this spring can be dispensed with, as when the rod is in position to support the bicycle the weight of the bicycle will hold the parts connected, and when the rod is elevated its own weight will perform the same function. In practice, however, we prefer to employ a spring as it will hold the parts securely in engagement and prevent them rattling.

To some part of the frame of the bicycle we attach a spring clip E with which the free end of the rod C engages to assist in holding the same in an elevated position; so that when the rod is elevated it is held positively at both ends.

We are aware that it has been proposed to provide a bicycle with an adjustable support made up of a rod and fixture which are connected to each other so that the rod might be held either raised or lowered, and we do not claim such construction broadly; but

What we do claim as new, and desire to secure by Letters Patent, is—

1. A bicycle support having a member which is adapted to be secured to the frame of the bicycle, said member having a lug with recesses $a^2$ in its outer edge, together with a member B pivotally connected to the lug and provided with a supporting rod C which is movable therein and adapted to engage the recesses in the lug, the rod having a collar $c$ for limiting its movement.

2. A bicycle support having a member which is adapted to be secured to the frame of the bicycle, said member having a lug with recesses $a^2$ in its outer edge, together with a member B pivotally connected to the lug and provided with a recess to receive the supporting rod C and helical spring $c'$, the supporting rod being movable in the recess and adapted to engage the recesses in the lug, the rod having a collar $c$ against which the helical spring bears, substantially as shown and for the purpose set forth.

In testimony whereof we affix our signatures in presence of two witnesses.

EBENEZER SCOTT.
JOHN O. BURKE.

Witnesses:
JAMES H. SICKLES,
CLARENCE BUCHANAN.